United States Patent
Endo et al.

(10) Patent No.: US 8,760,111 B2
(45) Date of Patent: Jun. 24, 2014

(54) SECONDARY BATTERY OUTPUT POWER CONTROLLER

(75) Inventors: Yasuhiro Endo, Toyota (JP); Hiroaki Takeuchi, Toyota (JP); Yukihiro Minezawa, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 59 days.

(21) Appl. No.: 13/643,276

(22) PCT Filed: Feb. 3, 2011

(86) PCT No.: PCT/JP2011/052237
§ 371 (c)(1),
(2), (4) Date: Oct. 24, 2012

(87) PCT Pub. No.: WO2012/105020
PCT Pub. Date: Aug. 9, 2012

(65) Prior Publication Data
US 2013/0038270 A1 Feb. 14, 2013

(51) Int. Cl.
*H02J 7/00* (2006.01)

(52) U.S. Cl.
USPC ............ 320/103; 320/132; 320/136

(58) Field of Classification Search
USPC ............. 320/103, 126, 132, 136, 140, 152
See application file for complete search history.

(56) References Cited

U.S. PATENT DOCUMENTS

| 5,905,360 A * | 5/1999 | Ukita ............ 320/118 |
| 8,354,818 B2 * | 1/2013 | Louch et al. ........ 320/101 |

FOREIGN PATENT DOCUMENTS

| JP | 9-308013 A | 11/1997 |
| JP | 11-082253 A | 3/1999 |
| JP | 2003-259508 A | 9/2003 |
| JP | 2004-364352 A | 12/2004 |
| JP | 2006-304393 A | 11/2006 |
| JP | 2007-335157 A | 12/2007 |
| JP | 2008-060047 A | 3/2008 |
| JP | 2009-232613 A | 10/2009 |
| JP | 2010-044895 A | 2/2010 |

OTHER PUBLICATIONS

International Search Report of PCT/JP2011/052237 mailed May 17, 2011.

* cited by examiner

*Primary Examiner* — Edward Tso
*Assistant Examiner* — Aaron Piggush
(74) *Attorney, Agent, or Firm* — Kenyon & Kenyon LLP

(57) ABSTRACT

An output power controller in a system having two or more secondary batteries connected in parallel. A battery ECU transfers all the stored electric charge from one secondary battery to another secondary battery when battery temperature and state of charge (SOC) are so low that an output power requirement cannot be satisfied. The SOC of the secondary battery increases by the transfer of the stored electric charge and output power sufficient for the output power requirement can be obtained. Further, the secondary batteries are heated by thermal energy generated by the transfer of the stored electric charge.

3 Claims, 6 Drawing Sheets

SECONDARY BATTERY OUTPUT POWER CONTROLLER

This is a 371 national phase application of PCT/JP2011/052237 filed 3 Feb. 2011, the contents of which are incorporated herein by reference.

TECHNICAL FIELD

The present invention relates to a secondary battery output power controller, and more particular to an output power controller in a system in which two or more secondary batteries are connected in parallel.

BACKGROUND ART

In hybrid or electric vehicles, a secondary battery such as a nickel hydride battery or lithium-ion battery is mounted as a power supply. Electric power from a secondary battery is converted by an inverter circuit to electric power for driving before being supplied to a motor. A secondary battery may be charged by regenerated electric power.

The amount of electric power obtainable from a secondary battery is significantly lowered in a low temperature environment such as in winter compared to under a normal temperature. Therefore, it has been an important object to study on how to obtain electric power from a secondary battery as effectively as possible at a low temperature.

Patent Document 1 noted below discloses a temperature adjustment device for a power supply device which includes two or more power storage elements connected adjacent to each other in parallel. When a temperature of the power supply device sensed by a temperature sensor is so low that an internal resistance may increase as high as to cause degradation in a charge/discharge performance, a mounted controller controls such that the charge/discharge operation is performed intensively by at least one of the two or more power storage elements. The temperature of the entire secondary battery in the parallel system is quickly increased by rapidly raising the temperature of the power storage element controlled to perform the intensive charge/discharge operation at the same time as raising the temperature of the adjacently-provided other power storage elements by using the heat generated from the power storage element controlled to perform the intensive charge/discharge operation.

PRIOR ART DOCUMENT

Patent Documents

Patent Document 1: JP 2010-44895A

DISCLOSURE OF THE INVENTION

Objects to be Achieved by the Invention

When charging/discharging is controlled to be intensively performed by at least one of the two or more power storage elements which are connected in parallel, the state-of-charge (SOC) of the power storage element may significantly drop compared to the other power storage elements, leading to a risk that required output power cannot be ensured. Therefore, techniques are required to control two or more power storage elements so as to not only quickly raise temperature under low temperature, but also avoid the situation where a certain power storage element would have a significantly low SOC which may result in a shortage of output power.

An object of the present invention is to provide control techniques such that, in a system having two or more secondary batteries connected in parallel, required output power can be ensured even at a relatively low battery temperature and low state of charge (SOC).

Means for Achieving the Objects

The present invention provides a secondary battery output power controller for controlling output power of a plurality of secondary batteries connected to each other in parallel. The plurality of secondary batteries comprise at least a first secondary battery and a second secondary battery. The controller comprises a sensor for sensing a state of the first secondary battery and the second secondary battery; and a control unit which controls the plurality of secondary batteries in accordance with the sensed state of the first secondary battery and the second secondary battery along with an output power requirement such that a stored electric charge of the first secondary battery is transferred to the second secondary battery, and output power is provided from the second secondary battery.

In one embodiment according to the present invention, the control unit transfers the stored electric charge from the first secondary battery to the second secondary battery when, compared to a sum of output power of the first secondary battery and output power of the second secondary battery, output power becomes higher when the stored electric charge of the first secondary battery is transferred to the second secondary battery, and the output power requirement can be satisfied.

In another embodiment according to the present invention, the sensor senses a temperature and a state of charge of the first secondary battery and the second secondary battery. The controller unit transfers the stored electric charge from the first secondary battery to the second secondary battery in accordance with the sensed temperature and the sensed state of charge of each of the first secondary battery and the second secondary battery.

In still another embodiment according to the present invention, the controller further comprises a buck-boost circuit connected to the first secondary battery and the second secondary battery. The controller unit transfers the stored electric charge from the first secondary battery to the second secondary battery by boosting or reducing voltage of the first secondary battery by the buck-boost circuit.

Effects of the Invention

According to a controller of the present invention, even when the temperature of secondary battery and state of charge (SOC) are relatively low, required output power can be ensured by transferring an electric charge.

BEST MODE FOR CARRYING OUT THE INVENTION

Figure 1:
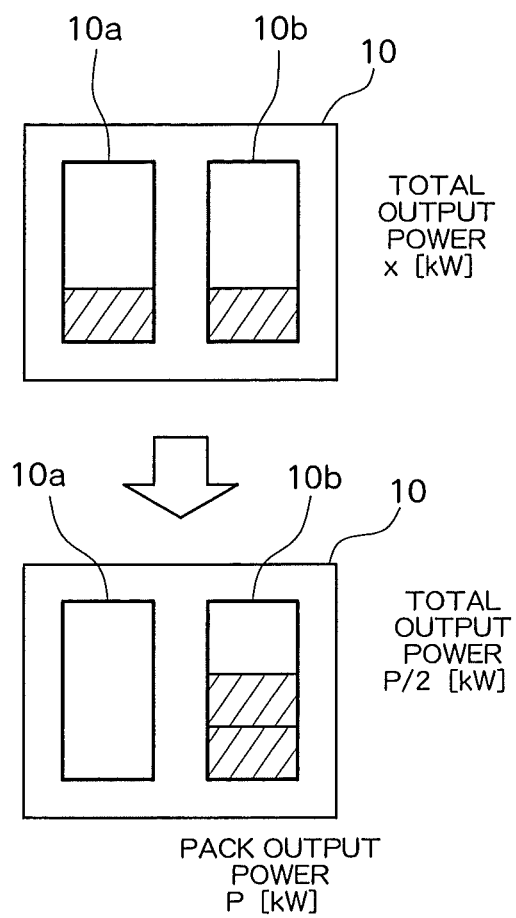
FIG. 1 is an explanatory drawing which shows a basic principal of an embodiment of the present invention.

Embodiments according to the present invention are described below by referring to the drawings. It should be noted, however, that the embodiments described below are provided merely as examples, and thus the present invention should not be limited to the embodiments shown below.

1. Basic Configuration and Basic Principle

First, the basic configuration and basic principle of embodiments according to the present invention are described. In a secondary battery according to the present embodiment, two or more secondary batteries or power storage elements are connected in parallel. FIG. 1 shows a secondary battery 10 according to the present embodiment. The secondary battery 10 is configured to include, for example, two secondary batteries 10a, 10b which are connected in parallel. The secondary batteries 10a, 10b may be a nickel hydride battery, lithium-ion battery, or the like. Each of the secondary batteries 10a, 10b is at a certain state of charge (SOC). The SOC of the secondary battery 10a is expressed as "SOCa", while the SOC of the secondary battery 10b is expressed as "SOCb". When power is supplied simultaneously from these two secondary batteries 10a, 10b connected in parallel, the total output power of the secondary battery 10 becomes the sum of the output power of the secondary battery 10a and the output power of the secondary battery 10b. The Total output power is expressed as "x" (kW).

If an output power requirement of the secondary battery 10 is less than x kW, it is possible to supply the required output power in this state. However, if the output power requirement is higher than x kW, it becomes impossible to satisfy the requirement. Thus, in the present embodiment, in such a situation, stored electric charge of one secondary battery is transferred to the other secondary battery. For example, as shown in the drawing, all the stored electric charge of the secondary battery 10a is transferred to the secondary battery 10b. Then, the SOC of the secondary battery 10a becomes 0%, while the SOC of the secondary battery 10b becomes SOCa+SOCb. The output power P with the SOC being SOCa+SOCb is predetermined. The output power from the entire secondary battery 10 becomes P/2. If P/2 can satisfy the output power requirement, the transfer of the stored electric charge from the secondary battery 10a to the secondary battery 10b can be considered as useful. On the contrary, if P/2 cannot satisfy the output power requirement, the transfer of the stored electric charge from the secondary battery 10a to the secondary battery 10b can be considered as unuseful.

In the present embodiment, it is determined whether or not a power requirement can be satisfied by transferring a stored electric charge from one secondary battery to the other secondary battery. If it is determined that the power requirement can be satisfied, the transfer of the stored electric charge is performed. If not, no transfer of the stored electric charge is performed. Thus, by such a transfer of stored electric charge, output power can be effectively ensured under low temperature and low SOC.

It should be noted that the transfer of stored electric charge according to the present embodiment has a secondary effect of raising the temperature of the secondary battery 10. That is, when transferring a stored electric charge, some energy generated along with the transfer is converted into thermal energy. This thermal energy can cause a rise in temperature of the secondary battery 10.

Figure 2:
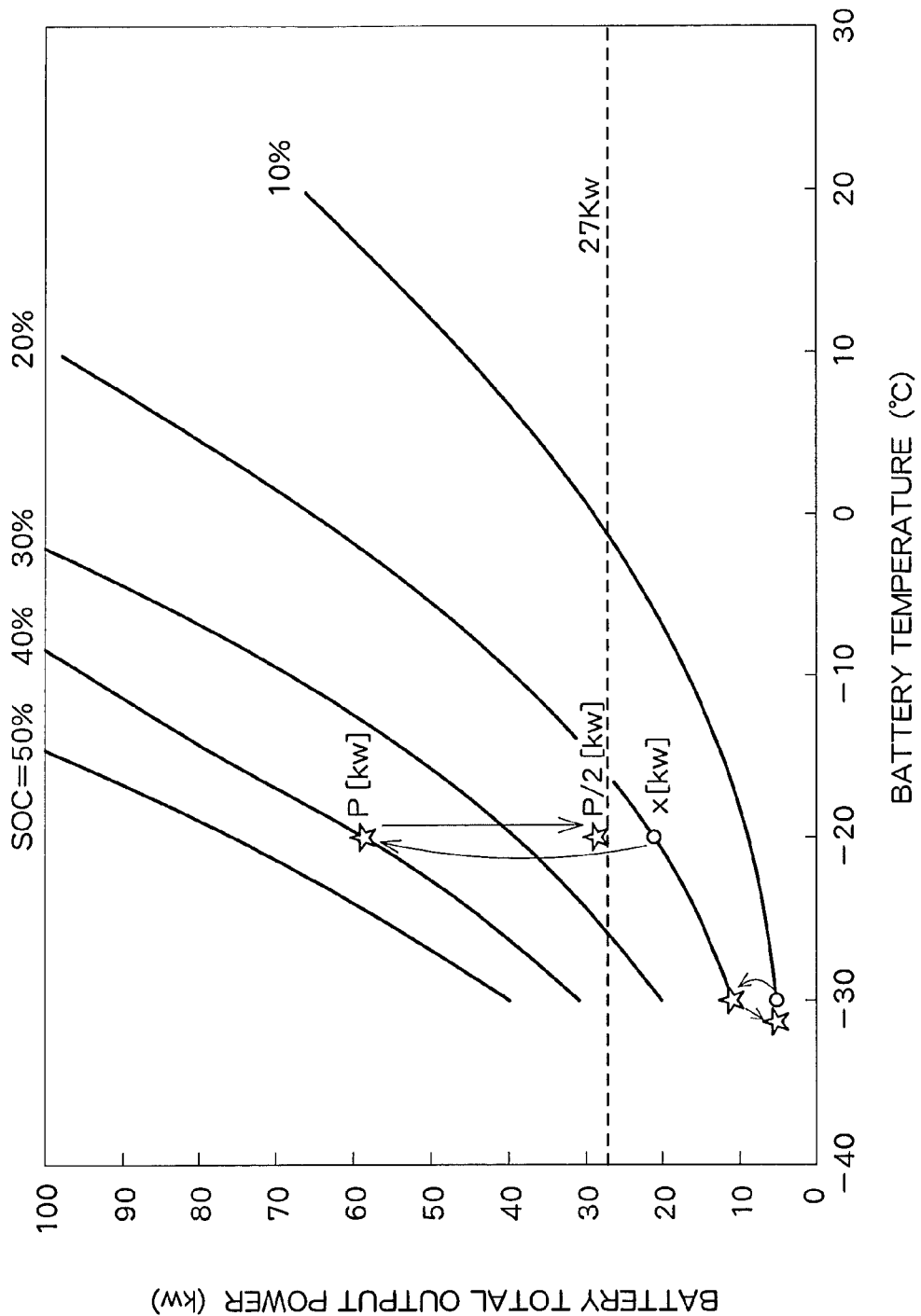
FIG. 2 is a graph which shows a relationship between a battery temperature and a total output power according to an embodiment of the present invention.

FIG. 2 shows a relationship between a battery temperature and total output power of the two secondary batteries by using the SOC of the secondary battery as a parameter. In the drawing, the horizontal axis represents a battery temperature (° C.), while the vertical axis represents total battery output power (kW) of the two secondary batteries connected in parallel.

Generally, the higher the battery temperature, the higher the total output power. Further, at the same battery temperature, the higher the SOC, the higher the total output power.

Here, the discussion will focus on the two secondary batteries at the battery temperature of −20° C. with the SOC of 20%. According to the graph, when SOC=20%, the total output power x=20 kW. If the output power requirement is 27 kW, the output power requirement cannot be satisfied in this state.

Thus, all the stored electric charge is transferred from one secondary battery to the other secondary battery. Then, one secondary battery will have SOC=0%, while the other secondary battery will have SOC=20%+20%=40%. It should be noted that although the SOC does not precisely become 40% because of small electric power loss, this error is ignored here. At the same battery temperature, the output power is 60 kW when SOC=40%. The total output power of the entire two secondary batteries becomes 60/2=30 kW. The output power requirement of 27 kW can be satisfied. Therefore, according to the present invention, the transfer process of all the stored electric charge from one secondary battery to the other secondary battery is performed.

Next, the discussion will focus on the two secondary batteries under the battery temperature of −30° C. with the SOC of 10%. According to the graph, the total output power x=5 kW when SOC=10%. If the output power requirement is 27 kW, the output power requirement cannot be satisfied in this state.

Thus, all the stored electric charge is transferred from one secondary battery to the other secondary battery. Then, one secondary battery will have SOC=0%, while the other secondary battery will have SOC=20%. The output power at this time is 10 kW. The total output power of the entire two secondary batteries becomes 10/2=5 kW, which does not present a difference. Therefore, according to the present embodiment, because the output power requirement cannot be satisfied even when the stored electric charge is transferred, no transfer process will be performed.

As described above, in the present embodiment, when the total output power of the system which is configured to include a plurality (two, for example) of secondary batteries connected in parallel does not satisfy an output power requirement, a transfer process of stored electric charge is performed only when it is determined that the total output power becomes high enough to satisfy the output power requirement if all the stored electric charge is transferred from one secondary battery to another secondary battery. Therefore, it is possible to reliably satisfy the output power requirement under conditions of low temperature and low SOC.

The mapping results shown in FIG. 2 can be obtained by measuring total output power under various temperature and SOC conditions for two secondary batteries in advance. The mapping results in FIG. 2 can be stored in a memory as a table which defines a relationship among a battery temperature, total output power, and SOC, or as a function of a battery temperature and total output power along with the SOC used as a parameter. It is possible to clearly determine whether or not the transfer of stored electric charge will be effective by referring, as required, to the table or function stored in the memory.

Embodiments according to the present invention are described below in more detail by using specific cases as examples where the embodiments are applied to vehicles such as hybrid or electric vehicles.

2. First Embodiment

Figure 3:
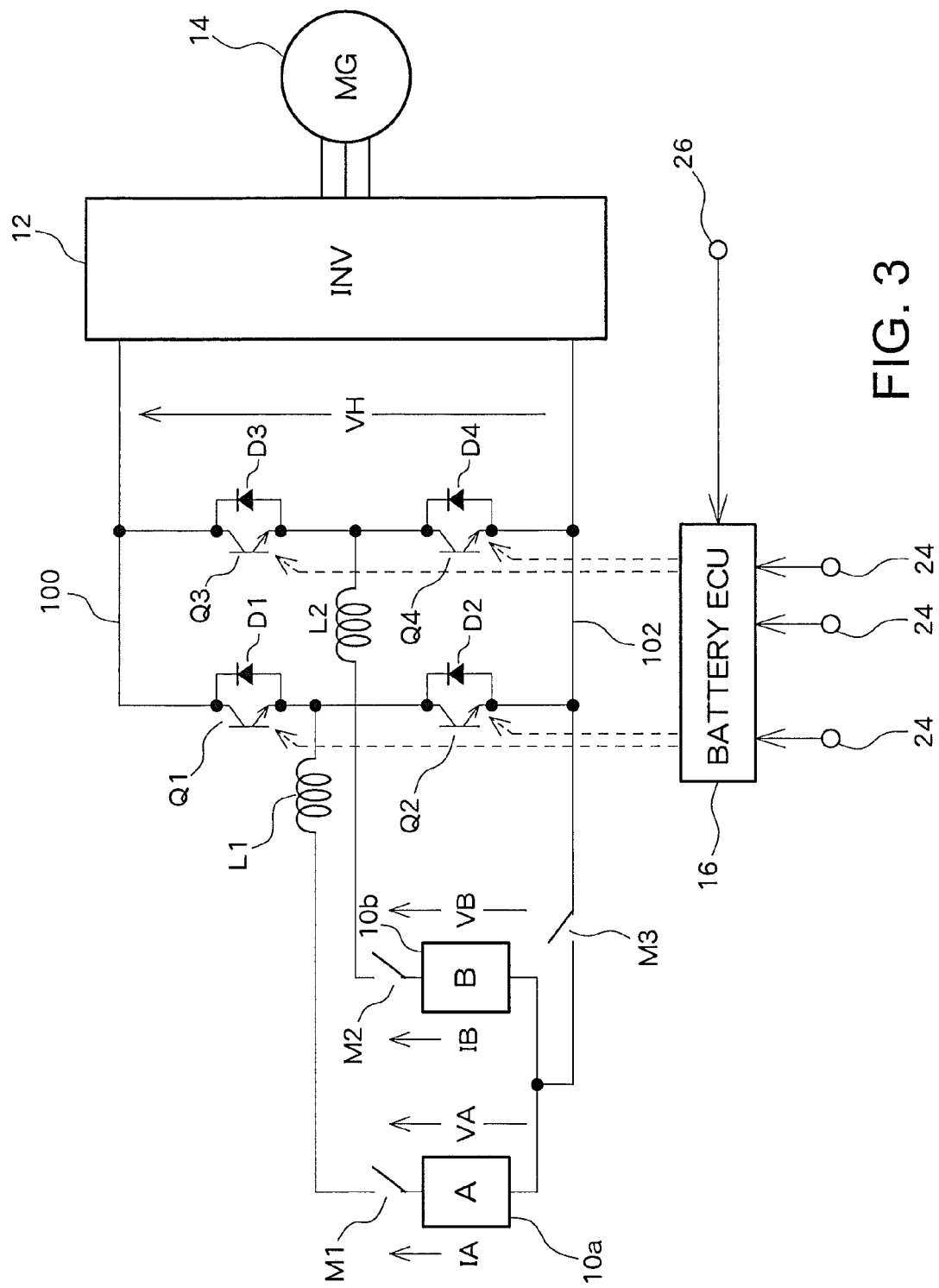
FIG. 3 is a circuit diagram according to a first embodiment of the present invention.

FIG. 3 shows a circuit configuration of a drive circuit for an embodiment according to the present invention. Electric power from a secondary battery is boosted by a buck-boost circuit (or converter) and supplied to an inverter circuit, which converts the DC power to AC power and supplies the converted power to a motor generator. The motor generator is connected to drive wheels of a vehicle. The secondary battery includes a secondary battery (A) 10a as a first secondary battery and a secondary battery (B) 10b as a second secondary battery. The secondary battery (A) 10a and the secondary battery (B) 10b are batteries of the same type, such as nickel hydride batteries or lithium-ion batteries.

The secondary battery (A) 10a has a positive terminal to which one end of a relay M1 is connected, while the secondary battery (B) 10b has a positive terminal to which one end of a relay M2 is connected. Negative terminals of the secondary battery (A) 10a and secondary battery (B) 10b are connected to each other and further to one end of a relay M3.

Connected to the other end of relay M1 is one end of a reactor L1. The other end of the reactor L1 is connected to a connection point between two switching elements Q1, Q2 which are connected to each other in series. Further, connected to the other end of relay M2 is one end of reactor L2. The other end of reactor L2 is connected to a connection point between two switching elements Q3, Q4 which are connected to each other in series. The other end of the relay M3 is connected to a negative line 102.

The buck-boost circuit (or converter) is configured to include a buck-boost chopper circuit. One buck-boost chopper circuit includes a reactor L1, switching elements Q1, Q2, diodes D1, D2. Another buck-boost chopper circuit includes a reactor L2, switching elements Q3, Q4, and diodes D3, D4. The switching elements Q1, Q2 are connected in series between the positive line 100 and negative line 102. Connected between a collector and emitter of each of the switching elements Q1, Q2 are antiparallel diodes D1, D2 which are arranged to allow electric current to flow from the emitter to the collector. A gate control signal is supplied from a battery ECU 16 to gates of the switching elements Q1, Q2. ON/OFF control of the switching elements Q1, Q2 is performed in response to the gate signal. The switching elements may be an Insulated Gate Bipolar Transistor (IGBT), for example. By performing ON/OFF control of the switching elements Q1, Q2, the voltage VA of the secondary battery (A) 10a is boosted and supplied to an inverter circuit 12. The boosting ratio is determined by an ON-period ratio, that is, duty ratio, of the switching elements Q1, Q2.

Similarly, the switching elements Q3, Q4 are connected in series between the positive line 100 and negative line 102. Connected between a collector and emitter of each of the switching elements Q3, Q4 are antiparallel diodes D3, D4 which are arranged to allow electric current to flow from the emitter to the collector. A gate control signal is supplied from the battery ECU 16 to gates of the switching elements Q3, Q4. ON/OFF control of the switching elements Q3, Q4 is performed in response to the gate signal. By performing ON/OFF control of the switching elements Q3, Q4, the voltage VB of the secondary battery (B) 10b is boosted and supplied to the inverter circuit 12.

It should be noted that when regeneration is being performed, the buck-boost circuit reduces voltage of a regenerated voltage and returns the voltage to the secondary battery (A) 10a and secondary battery (B) 10b.

The battery ECU 16 is supplied with temperature data which is sensed by a temperature sensor 20 which senses a temperature of each of the secondary battery (A) 10a and secondary battery (B) 10b; voltage data from a voltage sensor 22 which senses each of terminal voltage VA, VB; and electric current data from an electric current sensor 24 which senses each of charge/discharge electric current IA, IB. Further, as discussed below, a mode selection switch 26 which is operated by a driver as a user is provided at a driver's seat of a vehicle. The battery ECU 16 is also supplied with a mode signal from this mode selection switch. In accordance with these data and mode signal, the battery ECU 16 controls ON/OFF of the relays M1 to M3 and switching elements Q1 to Q4; supplies electric power from the secondary battery (A) 10a and secondary battery (B) 10b to the inverter circuit 12; and transfers stored electric charge (or electric power) from one of the secondary battery (A) 10a and the secondary battery (B) 10b to the other.

Specifically, in a normal state, the battery ECU 16 turns ON all the relays M1 to M3 and uses the secondary batteries 10a, 10b in a parallel connection. The DC voltage from the secondary battery (A) 10a and secondary battery (B) 10b is boosted by the buck-boost circuit and supplied to the inverter circuit 12. The inverter circuit 12 converts the DC power to AC power and supplies the converted power to the motor generator (MG) 14.

On the other hand, when a stored electric charge is transferred from the secondary battery (A) 10a to the secondary battery (B) 10b in order to satisfy an output power requirement because the output power requirement cannot be satisfied at a current battery temperature and SOC, the battery ECU 16 boosts the voltage VA of the secondary battery (A) 10a to VH by turning ON the relay M1 and turning ON and OFF the switching transistors Q1, Q2, while reduces the VH to VB by turning ON the relay M2 and turning ON and OFF the switching transistors Q3, Q4, where VH>VA, VB. The stored electric charge of the secondary battery (A) 10a is transferred to the secondary battery (B) 10b by such repeated operations of boosting and reducing voltage. Needless to say, the stored electric charge of the secondary battery (B) 10b can be transferred to the secondary battery (A) 10a in a similar manner.

Figure 4:
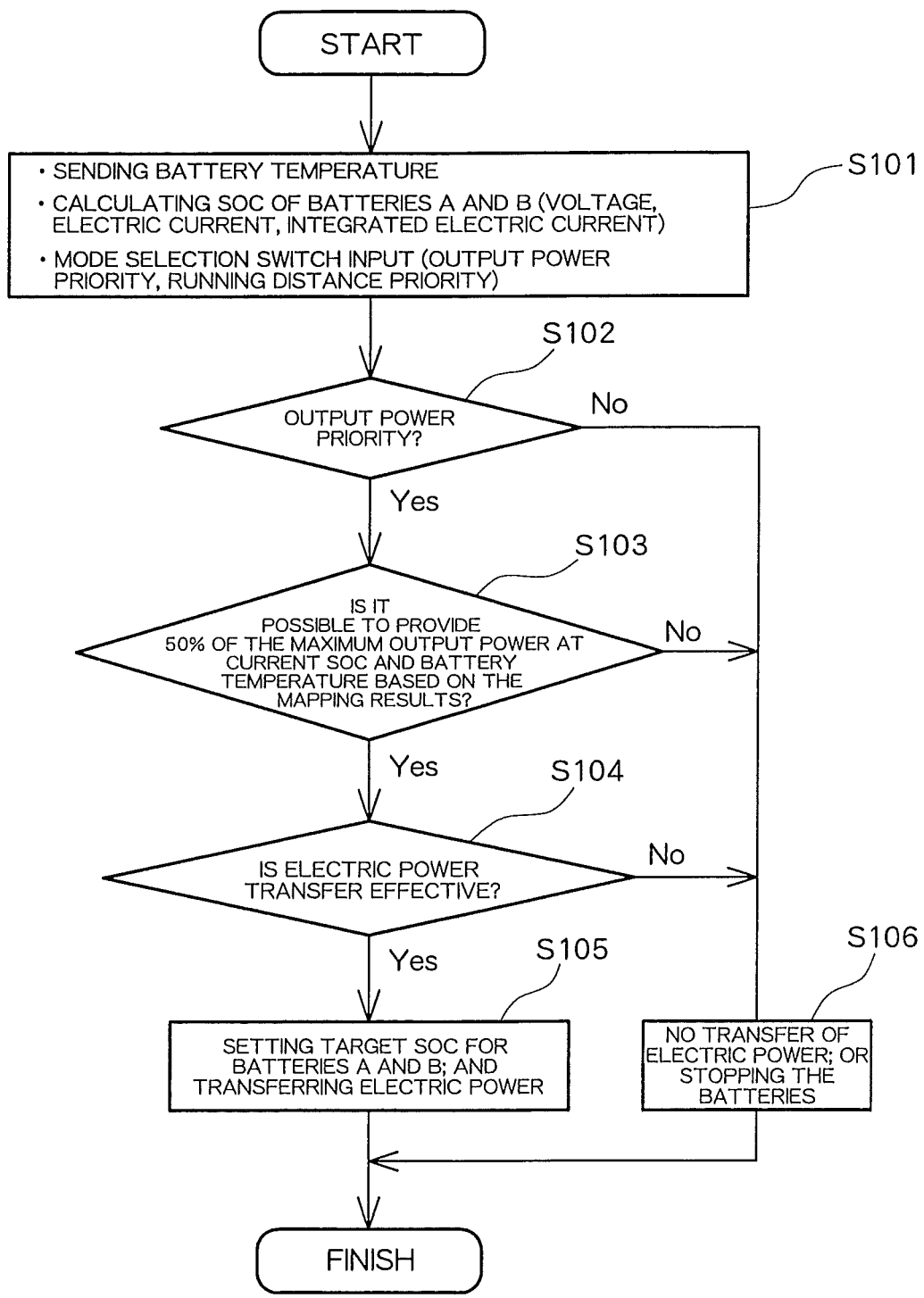
FIG. 4 is a process flow chart according to the first embodiment of the present invention.

FIG. 4 shows a process flow chart of the present embodiment. The process is performed when a vehicle is running or at rest, or when starting up of a vehicle. First, a temperature of each of the secondary battery (A) 10a and the secondary battery (B) 10b is sensed by a temperature sensor 20. At the same time, the battery ECU 16 calculates a SOC of each of the secondary battery (A) 10a and the secondary battery (B) 10b. Further, the battery ECU 16 receives an input from a mode selection switch 26 made by a user, that is a driver in the case of a vehicle (S101). The SOC of the secondary battery (A) 10a and the secondary battery (B) 10b is calculated based on the respective voltage, charge/discharge electric current, and electric current integrated value. For example, the electromotive force of the secondary battery (A) 10a and secondary battery (B) 10b is calculated based on each voltage and charge/discharge electric current. Then, the SOC can be obtained based on a predetermined relationship between the electromotive force and SOC. Further, a current SOC can be calculated by accumulating the charge/discharge electric current and adding the obtained value with the previous SOC. The mode selection switch 26 has two modes, output power priority mode and running distance priority mode. A user can select one of these modes and input the selected mode. In the output power priority mode, a priority is placed to satisfy an output power requirement, while in the running distance priority mode, a priority is placed to achieve a longer running distance than the output power. By keeping the output power low, the running distance can be made longer instead.

The battery ECU 16 determines whether or not the input of the mode selection switch indicates the output power priority (S102). If the mode selection switch does not indicate the output power priority, that is, if the running distance priority mode is selected, a transfer of stored electric charge (or electric power) is not performed (S106).

On the other hand, if the input from the mode selection switch indicates the output power priority, the battery ECU 16 determines whether or not 50% of the maximum output power can be made available with the current SOC and battery temperature by referring to the mapping results which were stored in memory in advance (S103). The value, 50% of the maximum output power, is one example. The value may be 40% or 60% of the maximum output power. As shown in FIG. 2, the mapping results define a relationship between a battery temperature and battery total output power by using the SOC as a parameter. The mapping results are determined in advance by experiments and stored in a built-in memory or an external memory of the battery ECU 16. When it is determined by referring to the mapping results that the 50% of the maximum output power cannot be obtained under the sensed temperature and calculated SOC in S101, no transfer of the stored electric charge is performed.

When the 50% of the maximum output power can be obtained, it is then determined whether or not the transfer of the stored electric charge will be effective (S104). As described above regarding this determination, the transfer of the stored electric charge is determined to be effective when the total output power would be increased by transferring the stored electric charge from one secondary battery to the other. If so, the battery ECU 16 performs the transfer of the stored electric charge after setting a target SOC for each of the secondary battery (A) 10a and secondary battery (B) 10b. More specifically, for example, when the SOC of both of the secondary battery (A) 10a and secondary battery (B) 10b before the transfer is 20%, the target SOC of the secondary battery (A) 10a is set at 0%, while the target SOC of the secondary battery (B) 10b is set at 40%. When the SOC of the secondary battery (A) 10a and the SOC of the secondary battery (B) 10b are different, the target SOCs can be determined by comparing the total output power for cases where the stored electric charge is transferred from the secondary battery (A) 10a to the secondary battery (B) 10b and where the stored electric charge is transferred from the secondary battery (B) 10b to the secondary battery (A) 10a, and by selecting the case where the total output power is higher. For example, when the total output power becomes higher with the stored electric charge transferred from the secondary battery (B) 10b to the secondary battery (A) 10a, the target SOC of the secondary battery (B) 10b is set at 0%. Then, the stored electric charge is transferred by truing ON and OFF the switching transistors Q1 to Q4 until each of the target SOCs of the secondary battery (A) 10a and secondary battery (B) 10b becomes the target SOC. If "No" is selected in S104, that is when it is determined that the transfer will not be effective, the battery ECU 16 performs no transfer of the stored electric charge (S106).

In the processes shown above, in a case where, in the output power priority mode, the two secondary batteries, secondary battery (A) 10a and secondary battery (B) 10b, are connected in parallel, the output power requirement can be satisfied even when the battery temperature and SOC are so low that the output power requirement cannot be obtained under the current status, by transferring all the stored electric charge from one secondary battery to the other.

3. Second Embodiment

Although in the first embodiment, the transfer of stored electric charge to the secondary battery (B) 10b is performed by using two buck-boost circuits (or converters) to boost and reduce voltage VA of the secondary battery (A) 10a, the transfer can also be performed by using only one buck-boost circuit.

Figure 5:
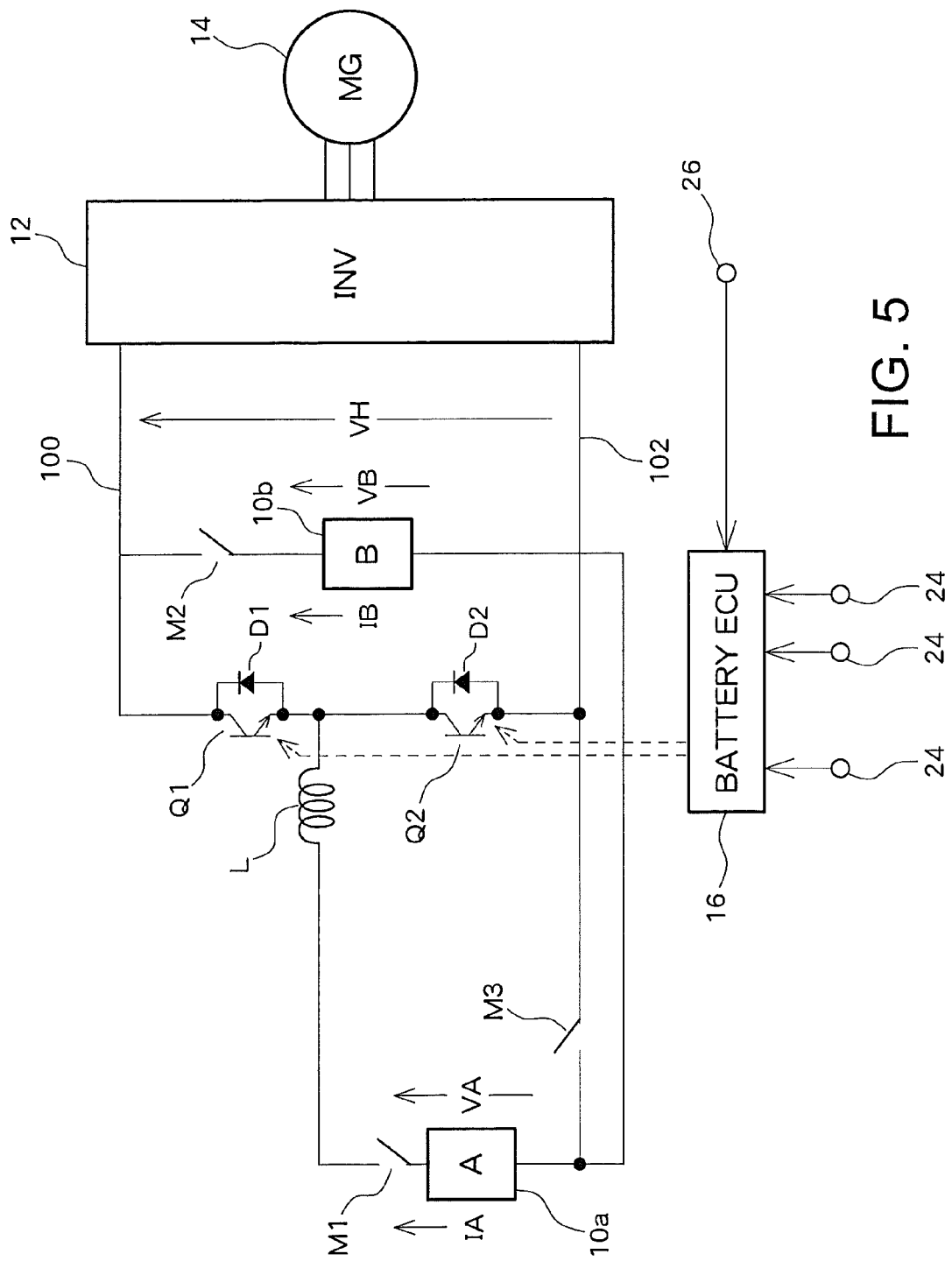
FIG. 5 is a circuit diagram according to a second embodiment of the present invention.

Such a configuration is described in this embodiment. FIG. 5 shows a circuit diagram of the present embodiment. A secondary battery (A) 10a has a positive terminal to which one end of a relay M1 is connected, while the other end of the relay M1 is connected to one end of a reactor L. A negative terminal of the secondary battery (A) 10a is connected to a negative terminal of the secondary battery (B) 10b and further to one end of a relay M3. The other end of the relay M3 is connected to a negative line 102.

The other end of the reactor L is connected to a connection point between switching elements Q1, Q2 which are connected in series between a positive line 100 and negative line 102. Connected between a collector and emitter of each of the switching elements Q1, Q2 are antiparallel diodes D1, D2.

A positive terminal of the secondary battery (B) 10b is connected to the positive line 100.

The buck-boost circuit (or converter) is configured from a buck-boost chopper circuit, specifically with a reactor L, switching elements Q1, Q2, and diodes D1, D2. A gate control signal is supplied from a battery ECU 16 to gates of the switching elements Q1, Q2. ON/OFF control of the switching elements Q1, Q2 is performed in response to the gate signal. By performing ON/OFF control of the switching elements Q1, Q2, the voltage VA of the secondary battery (A) 10a is boosted and supplied to an inverter circuit 12.

The battery ECU 16 is supplied with temperature data which is sensed by a temperature sensor 20 which senses a temperature of each of the secondary battery (A) 10a and secondary battery (B) 10b; voltage data from a voltage sensor 22 which senses each of terminal voltage VA, VB; and electric current data from an electric current sensor 24 which senses each of charge/discharge electric current IA, IB. Further, the battery ECU 16 is also supplied with a mode signal from the mode selection switch. In accordance with these data and mode signal, the battery ECU 16 controls ON/OFF of the relays M1 to M3 and switching elements Q1, Q2; supplies electric power from the secondary battery (A) 10a and secondary battery (B) 10b to the inverter circuit 12; and transfers stored electric charge (or electric power) from one of the secondary battery (A) 10a and the secondary battery (B) 10b to the other.

Specifically, in a normal state, the battery ECU 16 turns ON all the relays M1 to M3 and uses the secondary batteries 10a, 10b in a parallel connection. The DC voltage from the secondary battery (A) 10a is boosted by the buck-boost circuit and supplied to the inverter circuit 12. The inverter circuit 12 converts the DC power to AC power and supplies the converted power to the motor generator (MG) 14.

Further, when the temperature data shows a low temperature below a predetermined temperature and the SOC calculated from electric current data and other data shows a low SOC below a predetermined value, the battery ECU 16 transfers a stored electric charge from the secondary battery (A) 10*a* to the secondary battery (B) 10*b* by turning the relay M1 ON, turning the switching transistors Q1, Q2 ON and OFF to boost the voltage VA of the secondary battery (A) 10*a*, and turning the relay M2 ON.

Also in the present embodiment, an effective output power control becomes possible not by transferring the stored electric charge merely at low temperature and low SOC, but by transferring the stored electric charge only when an output power requirement can be satisfied by transferring the electric charge based on the mapping results stored in a memory in advance.

4. Third Embodiment

In each of the above embodiments, all the stored electric charge is transferred from one secondary battery to the other secondary battery in order to satisfy an output power requirement. This embodiment shows charge control performed during regeneration after such a transfer of stored electric charge. During regeneration, in a configuration shown in FIG. 3, for example, electric power from a motor generator (MG) 14 is converted by an inverter circuit 12 to DC power and supplied to a secondary battery (A) 10*a* and secondary battery (B) 10*b*. In this situation, the charge control is performed in the present embodiment as described below.

Figure 6:
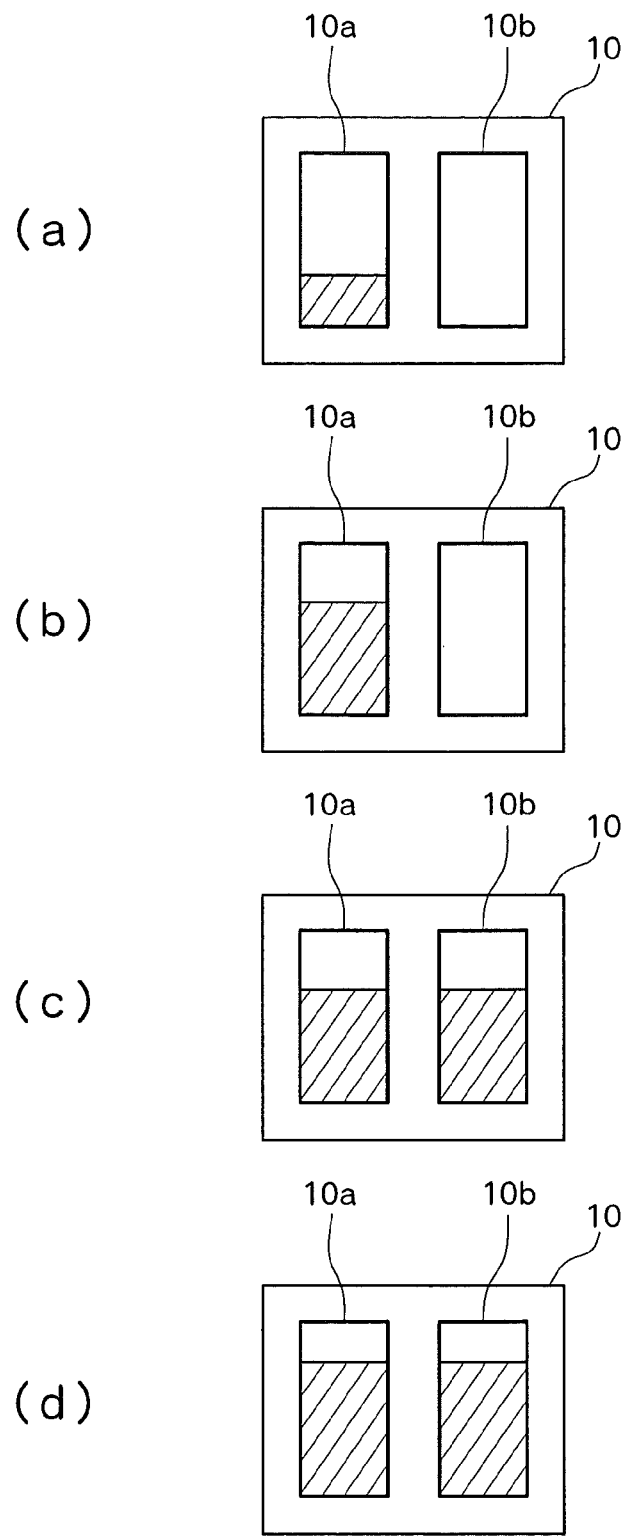
FIG. 6 is an explanatory drawing which shows a state of charge according to a third embodiment of the present invention.

Specifically, as shown in FIG. 6(*a*), the battery ECU 16 first charges the secondary battery 10*a* whose SOC is 0% after all the stored electric charge was transferred. This charging continues until the SOC reaches the point where deterioration rate of the secondary battery becomes high. The SOC which causes the deterioration rate to be high is, for example, 80% which is close to the full charge state. FIG. 6(*b*) shows the secondary battery 10*a* whose SOC is in this status.

When this state is reached, the battery ECU 16 controls to charge not the secondary battery 10*a* but the secondary battery 10*b*, as shown in FIG. 6(*c*). The battery ECU 16 continues to charge the secondary battery 10*b* until the SOCs of the secondary battery 10*a* and secondary battery 10*b* become equal to each other.

After the SOCs of the secondary batteries 10*a*, 10*b* become equal, the battery ECU 16 controls, as shown in FIG. 6 (*d*) to simultaneously charge both of the secondary batteries 10*a*, 10*b*.

By the above described charging control, it becomes possible to keep the SOCs of the secondary batteries 10*a*, 10*b* equal while restricting the deterioration of the secondary batteries 10*a*, 10*b*.

5. Modifications

In the above embodiments according to the present invention, it is determined whether or not to transfer a stored electric charge from one secondary battery to the other secondary battery by using a table or function defining mapping results shown in FIG. 2. However, it is also possible to uniformly control not to perform such a transfer of stored electric charge when the battery temperature or SOC of each of the secondary batteries is higher than a predetermined value. In other words, the transfer process of the stored electric charge from one of the secondary batteries to the other may be performed only when both of the battery temperature and SOC are lower than respective predetermined values.

Further, although in the above embodiments according to the present invention, cases with two secondary batteries are shown as examples of two or more secondary batteries, the same approach can be applied to three or more of the secondary batteries connected in parallel. In such a case, by assuming each of the three batteries connected in parallel as the first, second, and third secondary battery, each of the stored electric charge of the first and second secondary batteries is transferred to the third secondary battery when an output power requirement cannot be satisfied under the current status. Needless to say, it is also possible, if appropriate, to transfer the stored electric charge of only the first secondary battery to the second or third secondary battery. Basically, the transfer of stored electric charge may be performed if the total output power becomes higher when the stored electric charge is transferred than when the stored electric charge is not transferred. Among possible combinations of secondary batteries for the transfer, the combination which would achieve the highest total output power may be selected to perform the transfer.

Furthermore, in the above embodiments according to the present invention, the transfer of the stored electric charge is determined by using a table or function defining the mapping results in FIG. 2. However, because the mapping results in FIG. 2 can be varied in accordance with a deterioration ratio of a secondary battery, it is also possible to apply a configuration in which the table or function defining the mapping results in FIG. 2 is stored in advance in two or more locations in a memory so that the table and function can be switched as necessary in accordance with the deterioration ratio of the secondary battery. The deterioration of a secondary battery can be evaluated based on a history record of the secondary battery. Tables or functions may be switched by indirectly evaluating the deterioration ratio of the secondary battery by applying a running distance of a vehicle. The deterioration ratio may also be evaluated in accordance with an integrated value of charge/discharge electric current of the secondary battery.

REFERENCE NUMERALS

10 secondary battery, 12 inverter circuit, 14 motor generator, 16 battery ECU, 20 temperature sensor, 22 voltage sensor, 24 electric current sensor, 26 mode selection switch.

The invention claimed is:

1. A secondary battery output power controller for controlling output power of a plurality of secondary batteries connected each other in parallel, wherein
    the plurality of secondary batteries comprise at least a first secondary battery and a second secondary battery, and
    the controller comprises:
    a sensor for sensing a state of the first secondary battery and the second secondary battery; and
    a control unit which controls the plurality of secondary batteries in accordance with the sensed state of the first secondary battery and the second secondary battery along with an output power requirement such that a stored electric charge of the first secondary battery is transferred to the second secondary battery, and output power is provided from the second secondary battery,
    wherein the control unit transfers the stored electric charge from the first secondary battery to the second secondary battery if the output power becomes higher than the output power of the first secondary battery and the second secondary battery when the stored electric charge of the first secondary battery is transferred to the second secondary battery and if the output power requirement can be satisfied.

2. The secondary battery output power controller according to claim 1, wherein
- the sensor senses a temperature and a state of charge of each of the first secondary battery and the second secondary battery, and
- the control unit transfers the stored electric charge from the first secondary battery to the second secondary battery based on the sensed temperature and the sensed state of charge of each of the first secondary battery and the second secondary battery.

3. The secondary battery output power controller according to claim 1, further comprising
- a buck-boost circuit connected to the first secondary battery and the second secondary battery,
- wherein the controller unit transfers the stored electric charge from the first secondary battery to the second secondary battery by boosting or reducing voltage of the first secondary battery by the buck-boost circuit.

* * * * *

UNITED STATES PATENT AND TRADEMARK OFFICE
CERTIFICATE OF CORRECTION

PATENT NO.       : 8,760,111 B2
APPLICATION NO.  : 13/643276
DATED            : June 24, 2014
INVENTOR(S)      : Yasuhiro Endo et al.

Page 1 of 1

It is certified that error appears in the above-identified patent and that said Letters Patent is hereby corrected as shown below:

In the Specification

Column 8, line 36, please change "Agate control" to --A gate control--.

Signed and Sealed this
Twenty-first Day of April, 2015

Michelle K. Lee
*Director of the United States Patent and Trademark Office*